United States Patent
Brömse

[19]

[11] Patent Number: 5,828,045
[45] Date of Patent: Oct. 27, 1998

[54] OPTOELECTRONIC RECORD ELEMENT WITH ELECTRONIC FEEDBACK FOR POWER CONTROL

[75] Inventor: Norbert Brömse, Frankfurt, Germany

[73] Assignee: Linotype-Hell AG, Kiel, Germany

[21] Appl. No.: 718,534

[22] PCT Filed: Jan. 24, 1996

[86] PCT No.: PCT/DE96/00093

§ 371 Date: Dec. 10, 1996

§ 102(e) Date: Dec. 10, 1996

[87] PCT Pub. No.: WO96/24908

PCT Pub. Date: Aug. 15, 1996

[30] Foreign Application Priority Data

Feb. 8, 1995 [DE] Germany ............. 295 02 016 U

[51] Int. Cl.[6] .................................................. G06K 7/10
[52] U.S. Cl. ......................................... 235/455; 235/454
[58] Field of Search .................................. 235/454, 455, 235/462; 372/20, 23, 32, 92, 93, 33, 103, 108; 359/202, 824, 826; 356/124, 123

[56] References Cited

U.S. PATENT DOCUMENTS

| | | | |
|---|---|---|---|
| 3,681,709 | 8/1972 | Brown | 372/103 |
| 3,800,243 | 3/1974 | Wrobel et al. | 372/20 |
| 4,446,556 | 5/1984 | Koepf | 372/103 |
| 4,907,237 | 3/1990 | Dahmani et al. | 372/32 |
| 4,918,704 | 4/1990 | Caprara et al. | 372/99 |
| 5,387,786 | 2/1995 | Peng | 235/462 |
| 5,392,310 | 2/1995 | Klein | 372/103 |

FOREIGN PATENT DOCUMENTS

WO 92/10015  11/1992  WIPO.

OTHER PUBLICATIONS

Patent Abstract of Japan—JP 610 233 77—31 Jan. 1986.
Patent Abstracts of Japan—JP 601 586 82—20 Aug. 1985.

*Primary Examiner*—Donald T. Hajec
*Assistant Examiner*—Karl Frech
*Attorney, Agent, or Firm*—Hill & Simpson

[57] ABSTRACT

In an optoelectronic recording element for point-by-point and line-by-line recording, the recording element is composed of a laser diode for generating a light beam, of an objective, of a light detector arranged spaced from the laser diode and of a reflector arranged turned in the beam path of the light beam that reflects a part of the light beam onto the light detector. The reflector is composed of concave mirror segments that are positioned between the laser diode and the objective. The reflector has an aperture whose center line coincides with the optical axis and whose diameter at least corresponds to the diameter of the light part of the light beam employed for the recording. As a result thereof, the light part of the light beam employed for the recording passes through the reflector loss-free, and the light part of the light beam that is not used is nearly completely focussed onto the light detector.

14 Claims, 3 Drawing Sheets

OPTOELECTRONIC RECORD ELEMENT WITH ELECTRONIC FEEDBACK FOR POWER CONTROL

BACKGROUND OF THE INVENTION

The invention refers to the field of electronic reproduction technology and is directed to an optoelectronic recording element for a recording device, also referred to as a recorder or exposer, for the point-by-point and line-by-line recording of information on a recording material.

Such a recording element is essentially composed of a light source for generating a brightness-modulated light beam, of a drive circuit charged with an image signal for the light source, of an objective arranged on the optical axis of the light source for focussing the light beam onto the recording material, and of a diaphragm for limiting the light beam. The image signal contains the information to be recorded. The light beam modulated in brightness by the image signal undertakes the point-by-point and line-by-line exposure of the recording material, for example a film. A laser diode whose emitted light power is defined by a driver current through the laser diode is often employed as light source. The driver current is generated in the drive circuit dependent on the image signal.

For exposing two-level black/white information, the laser diode operates in switched mode wherein the light output by the laser diode is switched on and off by the driver current. In order to achieve a high recording quality, the level of the emitted light must be constant in the on-time intervals of the laser diode. Based on its very nature, a laser diode does not meet the demand for a constant light level in the on-time intervals since the emitted light power of a laser diode is temperature-dependent.

It is known to stabilize the light power emission of a laser diode with a light regulation. To that end, the light emitted by the laser diode is measured with a light detector and the measured signal generated by the light detector is returned as actual value to a regulator for the drive current via a feedback branch.

The light detector is, for example, a photodiode, also referred to as monitor diode or PIN diode. The laser diode and the monitor diode optically coupled thereto are often integrated in a common housing. The employment of an internal monitor diode has the disadvantage that the measured signal it generates is small and noise-infested, so that a good control quality and, thus, a high stability of the light power are thereby not achieved.

The employment of an external monitor diode, i.e. a monitor diode that is not accommodated in a common housing with the laser diode, is disclosed by EP-A-0 511 354. The optical coupling between the laser diode and the locally offset monitor diode therein ensues via a planar splitter mirror arranged in the beam path of the light beam that couples a portion of the light beam out and reflects it onto the external monitor diode. The use of a splitter mirror has the disadvantage that the light power of the light beam employed for the exposure is reduced and a lens is additionally required that focusses the portion of the light that has been coupled out onto the monitor diode. Moreover, a relatively long light path between laser diode and monitor diode derives in the known arrangement, so that the measured signal is correspondingly time-delayed and, thus, the regulation is considerably limited in bandwidth.

SUMMARY OF THE INVENTION

It is an object of the invention to improve upon an optoelectronic recording element with a laser diode such that a precise and fast regulation of the light power output by the laser diode is achieved.

According to the invention, an optoelectronic recording element is provided for point-by-point and line-by-line recording of information on a recording material. A laser diode is provided for generating a light beam along an optical axis. An objective is arranged on the optical axis for focusing the light beam onto the recording material. A light detector is arranged spaced from the laser diode for measuring a light power of the light beam. A reflector is arranged in the beam path of the light beam for reflecting a part of the light beam onto the light detector. The reflector comprises at least one mirror segment of a concave mirror positioned between the laser diode and the objective and an apex of which lies in a region of the optical axis. The concave mirror is arranged turned around the apex such that a principle axis of the concave mirror substantially bisects an angle defined by a distance straight-line between the laser diode and the apex and a distance straight-line between the light detector and the apex. The concave mirror has an aperture a center line of which substantially coincides with the optical axis and a diameter of which at least corresponds to a diameter of the light part of the light beam employed for the recording in the region of the concave mirror, as a result whereof the light part of the light employed for the recording passes through the concave mirror loss-free and the light part of the light beam not used for the recording is nearly completely focused onto the light detector.

The invention is explained in greater detail below with reference to FIGS. 1 through 3.

DESCRIPTION OF THE PREFERRED EMBODIMENTS

Figure 1:
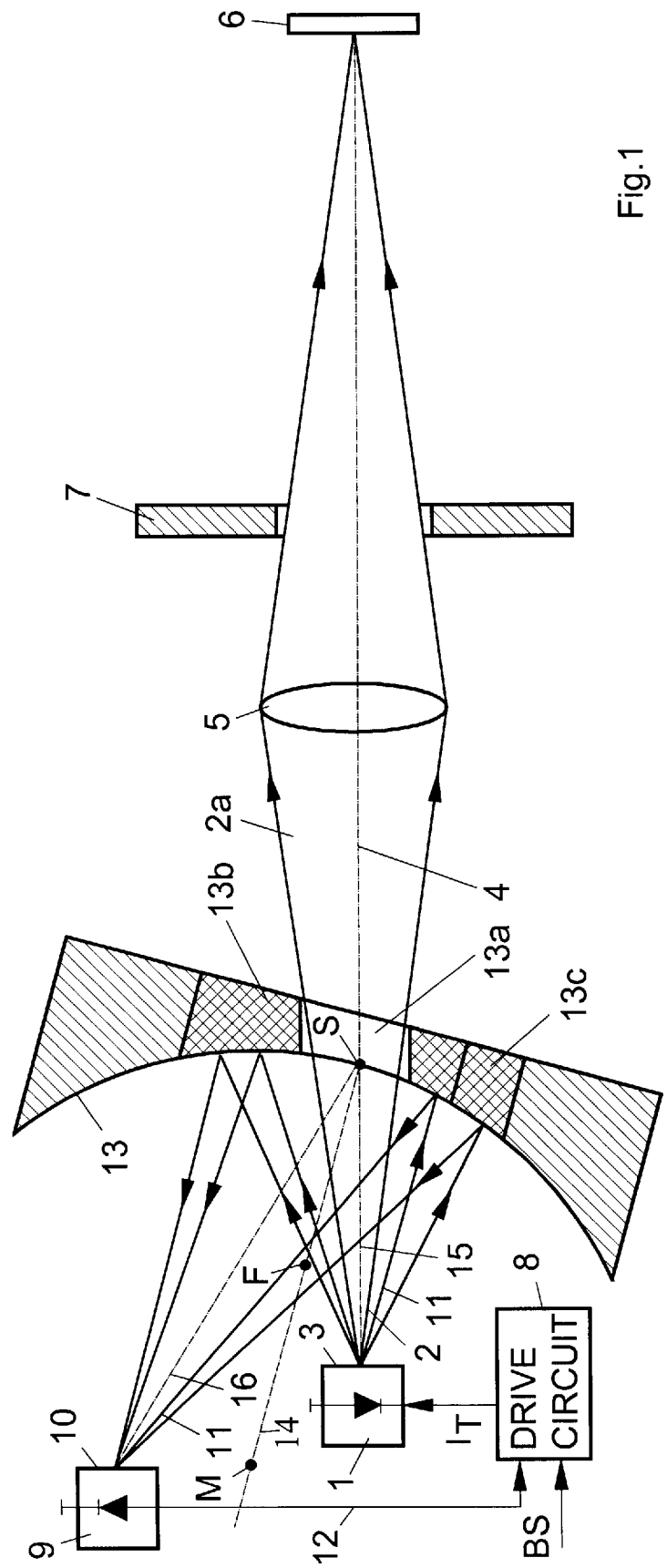
FIG. 1 is an exemplary embodiment of an optoelectronic recording element in section with a rotated concave mirror.

FIG. 1 shows a first exemplary embodiment of an optoelectronic recording element in section with a concave mirror arranged turned.

A laser diode 1 generates a divergent light beam 2 of which only the inner core is utilized as exposure beam 2a. The light beam 2 emerges from the laser diode 1 through a surface, called light exit window 3 below. The exposure beam 2a is focussed onto a recording material 6 with an objective 5 arranged on the optical axis 4 and is limited with a diaphragm 7. The driver current ($I_T$) for the laser diode 1 is generated in a drive circuit 8. The drive circuit 8 is charged with an image signal (BS) that contains the information to be recorded. The driver current ($I_T$) switches the light beam 2 on and off according to the information to be recorded.

Keeping the light power of the light beam 2 constant in the on-time intervals of the laser diode 1 ensues by regulation with a controller that is a component part of the drive circuit 8. A monitor diode 9 that is arranged outside the housing of the laser diode 1 is present as light detector for acquiring the actual value of the light power for the regulation. The light share 11 of the light beam 2 incident onto the light-sensitive surface of the monitor diode 9, referred to below as light entry window 10, is converted in the monitor diode into a measured signal acquiring the actual value of the light power that is returned onto the internal controller of the drive circuit 8 via a feedback branch 12.

In order to achieve a precise and fast regulation of the light power emitted by the laser diode 1, a concave mirror 13 with an aperture 13a or at least a mirror segment 13b;13c of a concave mirror is inventively arranged such between the laser diode 1 and the objective 5 that the exposure beam 2a employed for the exposure of the recording material 6 passes through the aperture 13a of the concave mirror 13 or, respectively, through the mirror segments 13b,13c without light losses and that light part 11 of the light beam 2 enveloping the exposure beam 2a is almost nearly completely focussed onto the light entry window 10 of the monitor diode 9 by the concave mirror 13 or, respectively, by the mirror segments 13b,13c. The concave mirror can, for example, be fashioned spherical, elliptical or parabolic.

A spherical concave mirror 13 is employed in the exemplary embodiment of FIG. 1. The spherical concave mirror 13 has a principal axis 14 on which the mid-point (M) of the spherical mirror surface lies with the radius (R) around the mid-point (M) [sic]. The intersection of the principal axis 14 with the spherical mirror surface is referred to as apex (S). The focal point (F) of the spherical concave mirror 13 on the principal axis 14 bisects the distance between mid-point (M) and apex (S). A subject is imaged by the concave mirror 13 corresponding to the ratio of subject distance to image distance.

Given the exemplary embodiment shown in FIG. 1, the apex (S) of the spherical concave mirror 13 lies on the optical axis 4 of the recording element, and the spherical concave mirror 13 is arranged turned such around its apex (S) that the light exit window 3 of the laser diode 1 is imaged onto the light entry window 10 of the monitor diode 9. This is the case when the principal axis 14 bisects the angle that this describes with the spacing straight-line 15 between laser diode 1 and apex (S) and with the spacing straight-line 16 between monitor diode 9 and apex (S). The center line of the aperture 13a of the spherical concave mirror 13 coincides with the optical axis 4 of the recording element. The diameter of the aperture 13a is selected somewhat larger than the diameter of the exposure beam 2a in the region of the spherical concave mirror 13, so that the exposure beam 2a passes through the aperture 13a of the spherical concave mirror 13 without light loss.

When only the mirror segments 13b,13c are employed, these have a spacing from one another in the region of the optical axis 4 that corresponds to the diameter of the aperture 13a.

The concave mirror 13 or the mirror segments 13b,13c are, for example, glass members whose inside surface is mirrored with aluminum (by vapor-deposition).

Figure 2:
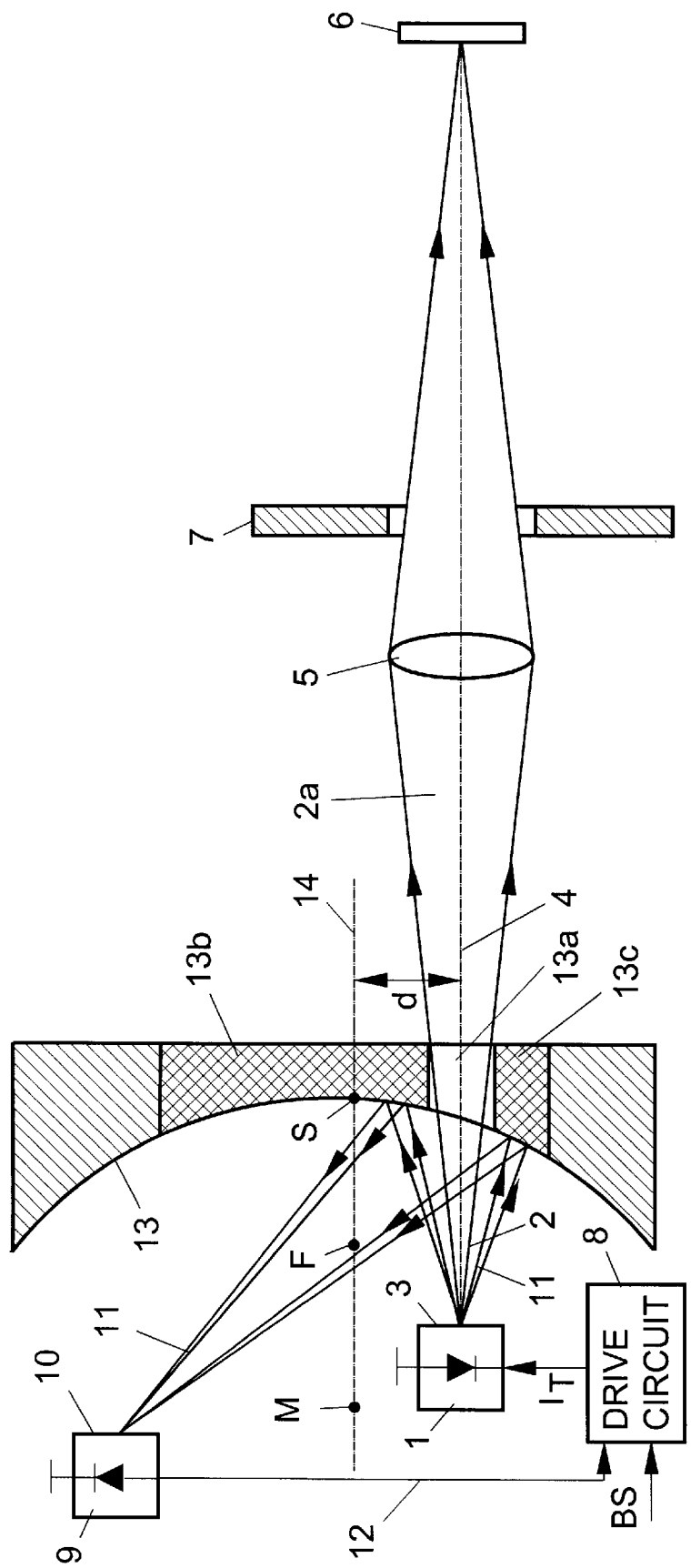
FIG. 2 another exemplary embodiment of an optoelectronic recording element in section with an offset concave mirror.

FIG. 2 shows a second exemplary embodiment of an optoelectronic recording element in section with a concave mirror arranged offset.

The second exemplary embodiment, wherein a spherical concave mirror 13 is likewise employed, differs from the first exemplary embodiment in that the spherical concave mirror 13 is offset parallel to the optical axis 4 of the recording element and is not arranged turned as in the first exemplary embodiment. In this case, the spherical concave mirror 13 has an aperture 13a whose center line comprises a distance (d) from the principal axis 14 of the concave mirror 13. The parallel offset of the spherical concave mirror 13 is undertaken such that the principal axis 14 of the spherical concave mirror 13 comprises a distance d from the optical axis 4 of the recording element. The center line of the aperture 13a of the spherical concave mirror 13 then coincides with the optical axis 4 of the recording element, and the exposure beam 2a again passes through the aperture 13a of the concave mirror 13 without light loss.

Figure 3:
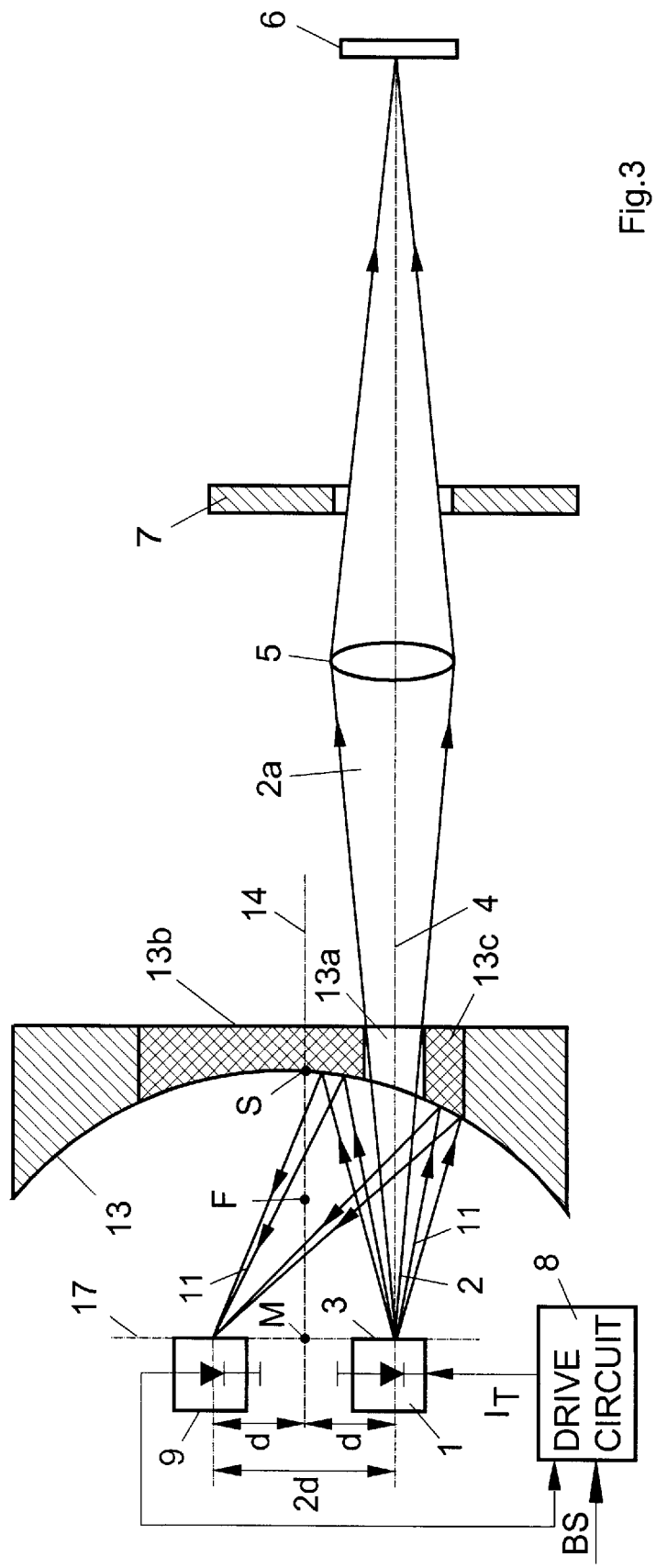
FIG. 3 is a further exemplary embodiment of an optoelectronic recording element in section with a preferred arrangement of laser diode and monitor diode.

FIG. 3 shows a further exemplary embodiment of an optoelectronic recording element in section with a preferred arrangement of laser diode 1 and monitor diode 9. In this exemplary embodiment, the spherical concave mirror 13 is likewise arranged offset from the optical axis 4 by the distance d, as in the exemplary embodiment of FIG. 2. The difference compared to the exemplary embodiment of FIG. 2 is comprised therein that the mid-points of the light exit window 3 of the laser diode 1 and of the light entry window 10 of the monitor diode 9 are positioned spaced 2d on a straight line 17 that is perpendicular to the optical axis 4 of the optoelectronic recording element. The spacing between the straight line 17 and the concave mirror 13 is selected such that the focal point (F) of the concave mirror 13 lies in the middle on the principal axis 14 between the apex (S) and the intersection 18 of the principal axis 14 with the straight line 17. The intersection 18 has the respective distance (d) from the mid-points of the light exit window 3 of the laser diode 1 and the light entry window 10 of the monitor diode 9.

Given this arrangement, the light exit window 3 of the laser diode 1 is imaged on the light entry window 10 of the monitor diode 9 in the scale 1:1. The light path between laser diode 1 and monitor diode 9 is minimal, and short electrical transit times derive. The spacing between laser diode 1 and monitor diode 9 is defined by the minimal structural spacing of these components.

In the exemplary embodiments of FIGS. 2 and 3, appropriately positioned mirror segments 13b,13c of a concave mirror 13 can also again be employed instead of a complete concave mirror 13 with an aperture 13a.

In all exemplary embodiments, the monitor diode 9 can be arranged turned such that the light is perpendicularly incident onto the light entry window 10.

The inventive employment of a concave mirror for the reflection of a light part of the exposure beam used for the exposure onto an external monitor diode for the purpose of regulating the light power output by a laser diode has the following advantages over and above this. In that the exposure beam passes through the concave mirror without significant light losses, a large part of the light generated by the laser diode can be utilized for exposing the recording material. Moreover, no high quality demands are made of the concave mirror since the exposure beam does not come into contact with the concave mirror. Due to the employment of a concave mirror as light reflector and due to the specific arrangement of the concave mirror within the recording element, a high part of the light generated by the laser diode outside the exposure beam is reflected onto the monitor diode, as a result whereof a high control signal amplitude is acquired and, consequently, the light power of the laser diode can be controlled with high precision. Due to the selected arrangement of laser diode, monitor diode and concave mirror, the light path between laser diode and monitor diode and, thus, the time delay of the control signal are relatively short. As a result thereof, the light power of the laser diode can also be controlled with high speed given a high modulation frequency. The fast and precise regulation of the laser light output by the laser diode for exposing the recording material in a recording device advantageously leads to a significant improvement of the recording quality.

Although various minor changes and modifications might be proposed by those skilled in the art, it will be understood that my wish is to include within the claims of the patent warranted hereon all such changes and modifications as reasonably come within my contribution to the art.

I claim as my invention:

1. An optoelectronic recording element for point-by-point and line-by-line recording of information on a recording material, comprising:
   a laser diode for generating a light beam along an optical axis;
   an objective arranged on the optical axis for focussing the light beam onto the recording material;
   a light detector arranged spaced from the laser diode for measuring a light power of the light beam;
   a single reflector only arranged in the beam path of the light beam for reflecting a light part of the beam onto the light detector;
   the single reflector comprising at least one mirror segment of a concave mirror positioned to have its curved surface facing the laser diode and between the laser diode and the objective and an apex of which lies in a region of the optical axis;
   the concave mirror being rotated at the apex such that a principal axis of the concave mirror substantially bisects an angle defined by a straight-line between the laser diode and the apex and a straight-line between the light detector and the apex; and
   the concave mirror having an aperture, a center line of which substantially coincides with the optical axis and a diameter of which is larger than a diameter of a light part of the light beam employed for the recording so that the light part of the light beam employed for the recording passes through the concave mirror loss-free and the light part of the light beam not used for the recording is substantially completely focussed onto the light detector.

2. The optoelectronic recording element according to claim 1 wherein the at least one mirror segment comprises a concave mirror.

3. The optoelectronic recording element according to claim 1 wherein the concave mirror is spherical.

4. The optoelectronic recording element according to claim 1 wherein the concave mirror is formed of a glass member, a mirror surface of which is vapor-deposited with aluminum.

5. The optoelectronic recording element according to claim 1 wherein:
   the light part of the light beam focussed onto the light detector with the concave mirror is converted into a measured signal; and
   the measured signal is connected to a driver circuit as an actual value for regulation of the light power output by the laser diode, the laser diode being connected to the driver circuit.

6. The optoelectronic recording element according to claim 1 wherein a monitor diode is employed as said light detector.

7. An optoelectronic recording element for point-by-point and line-by-line recording of information on a recording material, comprising:
   a laser diode for generating a light beam along an optical axis;
   an objective arranged on the optical axis for focussing the light beam onto the recording material;
   a light detector arranged spaced from the laser diode for measuring a light power of the light beam;
   a single reflector only arranged in the beam path of the light beam for reflecting a light part of the beam onto the light detector;
   the single reflector comprising at least one mirror segment of a concave mirror positioned to have its curved surface facing the laser diode and between the laser diode and the objective;
   the concave mirror being arranged offset relative to the optical axis such that a principal axis of the concave mirror proceeds substantially parallel to the optical axis at a distance therefrom; and
   the concave mirror has an aperture whose center line substantially coincides with the optical axis and a diameter of which is larger than a diameter of a light part of the light beam employed for the recording in the region of the concave mirror, the larger diameter ensuring that the light part of the light beam employed for the recording passes through the concave mirror loss-free and the light part of the light beam not used for the recording is nearly completely focussed onto the light detector.

8. The optoelectronic recording element according to claim 7 wherein the laser diode and the light detector are arranged on a straight line proceeding substantially perpendicular to the principal axis of the concave mirror and spaced at a distance from the principal axis.

9. The optoelectronic recording element according to claim 8, wherein the distance between the straight line and the concave mirror is selected such that a mid-point of the spherical concave mirror lies on the straight line.

10. The optoelectronic recording element according to claim 7 wherein the at least one mirror segment comprises a concave mirror.

11. The optoelectronic recording element according to claim 7 wherein the concave mirror is spherical.

12. The optoelectronic recording element according to claim 7 wherein the concave mirror is formed of a glass member a mirror surface of which is vapor-deposited with aluminum.

13. The optoelectronic recording element according to claim 7 wherein:
   the light part of the light beam focussed onto the light detector with the concave mirror is converted into a measured signal; and
   the measured signal is employed as an actual value connected to a drive circuit for regulation of the light power output by the laser diode, said laser diode being connected to said drive circuit.

14. The optoelectronic recording element according to claim 7 wherein a monitor diode is employed as said light detector.

* * * * *